GEORGE E. BURT AND EDWIN A. HILDRETH, OF HARVARD, MASSACHUSETTS.

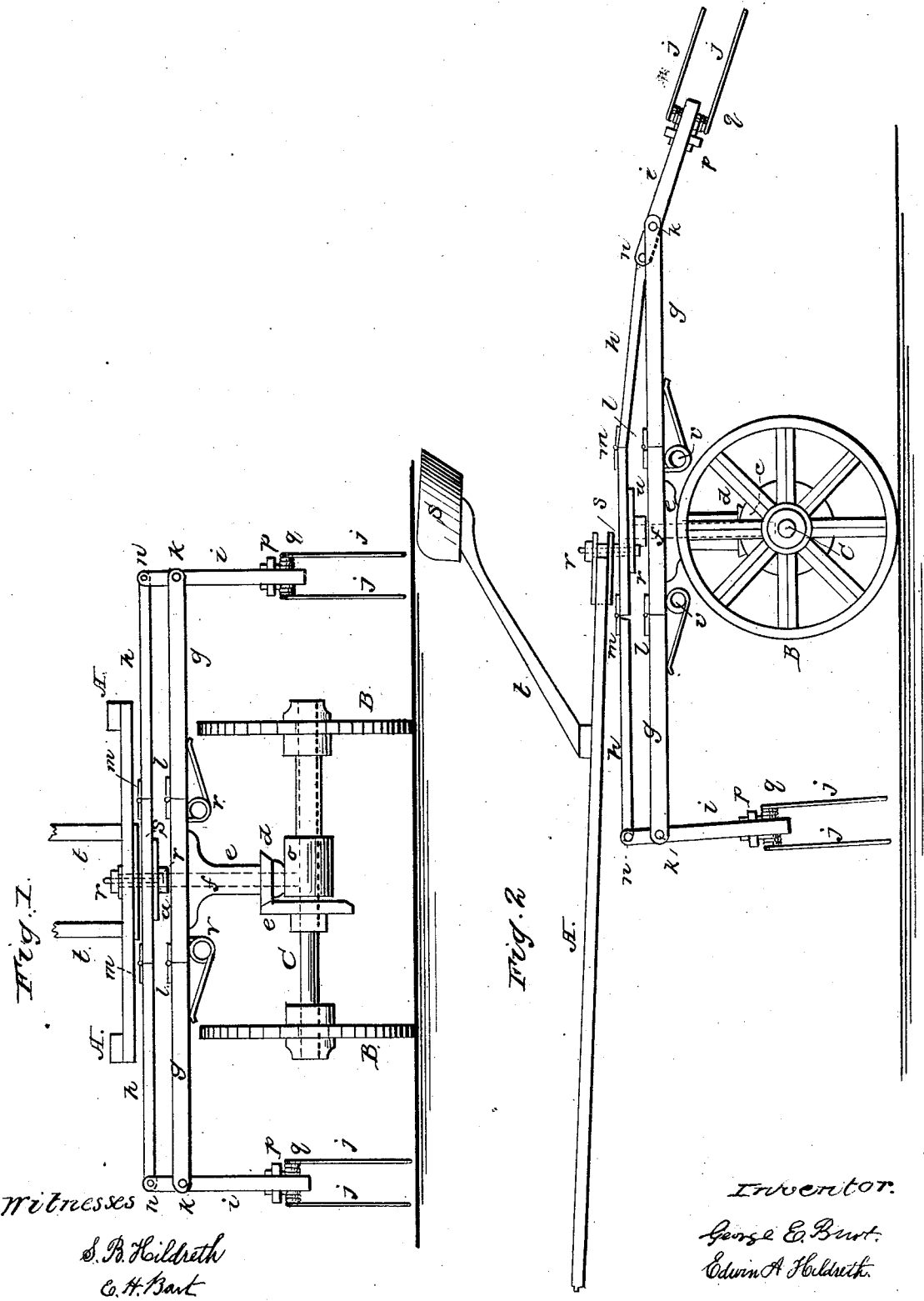

Letters Patent No. 84,257, dated November 24, 1868.

IMPROVEMENT IN HAY-SPREADERS.

The Schedule referred to in these Letters Patent and making part of the same.

*To all whom it may concern:*

Be it known that we, GEORGE E. BURT and EDWIN A. HILDRETH, both of Harvard, in the county of Worcester, and State of Massachusetts, have invented a new and useful Improvement in Hay-Tedders; and we do hereby declare that the following is a full and exact description thereof, reference being had to the accompanying drawings, and to the letters of reference marked thereon.

It is well known that in hay-tedders now in use, constructed with vertically-revolving forks, either propelled by reels, cranks, or other devices, the supporting wheels roll on the hay; those that are constructed with revolving reels, with the supporting-wheels outside of the reels, rest on and tread the hay down after it has been teddered; and those tedders, with the wheels in front of the operating-cranks or forks, roll on the hay before it is teddered.

The great objection to putting the wheels in front of the forks is that, in passing over irregular ground, the rear end of the tedder is tilted down or up, and the forks dig into the elevations of earth, or leave the hay in depressions or hollows without stirring it, thus breaking the forks, and otherwise increasing the liability of injuring the machine.

To overcome the above objections, and also to construct a very cheap tedder, is the object of this invention.

The nature of our invention consists in constructing hay-tedders with revolving forks, so acting that the hay is removed from the front of the wheels in such a manner that they do not roll on the hay, either before or after it is teddered.

Also, in constructing horizontal-propelling arms, so as to allow the forks to follow the irregular surface of the ground without digging into the earth, and to pass obstacles without strain or damage to the forks.

Also, in giving such motion to the forks that they will dip and gather the hay in front of the wheels of the tedder, and rise and discharge it on one side or in the rear.

In the accompanying drawings—

Figure 1 is an end view.

Figure 2 is a side view.

To enable others skilled in the art to make and use our invention, we will proceed to describe its construction and operation.

In the accompanying drawings, B B are the supporting-wheels; A A, the thills; C, the axle; c, a bevel-gear; d, the pinion, which is firmly fixed to the propelling-tube e, which is constructed at the top with projections, to which are attached the horizontal propelling-arms g g.

The tube e is provided with a hole or chamber, which fits the upright shaft f, upon which the tube revolves.

The shaft f is firmly fixed to the tube o, which is fitted to the axle C, so as to allow the axle to turn freely.

u is a disk, which is firmly fixed to the shaft f.

s is a wrist, placed eccentrically to the shaft f, and is attached to the disk u, which is provided with two or more seats for the wrist s, which, in the drawings, is placed in front, or nearest the thills.

h h are operating-arms, constructed with flexible joints m m, and are attached to the wrist s, and revolve on it.

The propelling-arms g g are provided with flexible joints l l, and are attached to the tube e, which revolves on the shaft f.

i i are fork-staves, and are pivoted to arms g g and h h by pivots k k and n n.

j j are forks, and are attached to the staves i i by pins q and p.

r is a screw-nut and bolt, that attaches the thills to the tedder.

S is the seat for the driver, supported by seat-springs t t.

v v are springs, which tend to lift a portion of the dead weight of the revolving arms g g.

Any number of arms and forks may be employed that may be found desirable.

Operation.

When a horse is attached to the thills, and the tedder is drawn forward, the supporting-wheels B roll on the ground, which turns the axle C and the bevel-gear c, which cogs into the pinion d and turns the tube e.

The propelling-arms g g, being fixed to the tube e, are revolved horizontally around the upright shaft f, which is held firmly and still in position by the tube o on the axle C.

The operating-arms h h turn on the wrist s in the disk u, the wrist being placed eccentrically with the shaft f.

The operating-arms h h and the propelling-arms g g being both attached to the fork-staves i i by the pivots k k and n n, all revolve together.

The arms g g have the shaft f for a centre, and the arms h h have the wrist s for a centre.

As the wrist s is placed at a point in front of the shaft f, and is stationary, it will be seen that the arms g g and h h revolve eccentrically in regard to each other, and as these arms are connected together by the fork-staves i i and the pivots k and n, the forks are made to dip, and stand nearly at right angles with the arms g g, and gather the hay in front of the tedder; but as the forks revolve, they are made to rise, so as to stand nearly in a right line with the arms g g in the rear, and thus discharge the hay in the rear of the tedder, completely stirring up the hay, leaving it very light to dry, and clearing the track for the wheels from all the hay as the tedder moves on.

The flexible joints $l$ and $m$, in the arms $g\,g$ and $h\,h$, allow the forks $j\,j$ to rise and fall, and thus follow the uneven surface of the ground.

The springs $v\,v$, lifting a portion of the dead weight of the revolving arm $g$ and fork-staves $i$, allow the forks to glide easily over rough, uneven ground, without liability of digging on the elevations, or leaving the hay in depressions.

The elasticity of the forks allows them to yield to abrupt obstacles.

By changing the position of the eccentric-wrist $s$, the hay may be discharged on the side into a windrow, and thus the tedder may also be used as a rake.

What we claim as our invention, and desire to secure by Letters Patent, is—

1. The forks $j\,j$, when so arranged as to revolve horizontally over the ground, turning the hay, substantially as described, and for the purpose set forth.

2. The forks $j\,j$, when so arranged as to revolve horizontally over the ground and sweep the hay from before the wheels, in order to give them a path clear from grass or hay, substantially as described and set forth.

3. The arms $g$ and $h$, in combination with the fork-handle $i$, when so arranged as to revolve the forks $j\,j$ horizontally over the surface of the ground, gathering and discharging or turning the hay, substantially as described and set forth.

4. The forks $j\,j$, when actuated by mechanism, so constructed that there shall be imparted to the forks, in addition to their horizontal rotary motion, a dipping and rising motion, to collect and discharge the hay, substantially as described.

5. The forks $j\,j$, when hung from hinges $l$ and $m$, (one or both,) and so arranged that the forks can freely rise, and pass over rising ground or obstacles, substantially as described, and for the purpose set forth.

6. The shaft $f$, disk $u$, and eccentric-wrist $s$, in combination with the driving-arm $g$ and operating-arm $h$, arranged to operate the forks $j\,j$, substantially as described.

7. The gear $c$, pinion $d$, tube $e$, shaft $f$, disk $u$, and wrist $s$, when used in combination to operate the arms and forks of a hay-tedder or rake, substantially as described.

8. The flexible joints $l$ and $m$ in the arms $g$ and $h$, to allow the forks to follow over rising ground or obstacles, substantially as described, and for the purpose set forth.

9. The combination of the forks $j\,j$, the pivots $q$, pins $p$, staves $i$, and pivots $k$ and $n$, with the driving-arm $g$ and operating-arm $h$, operating as and for the purposes set forth.

10. The springs $v\,v$, when so arranged as to lift a portion of the weight of the forks $j\,j$ and their connections, substantially as described, and for the purpose set forth.

GEORGE E. BURT.
EDWIN A. HILDRETH.

Witnesses:
S. B. HILDRETH,
E. H. BURT.